UNITED STATES PATENT OFFICE.

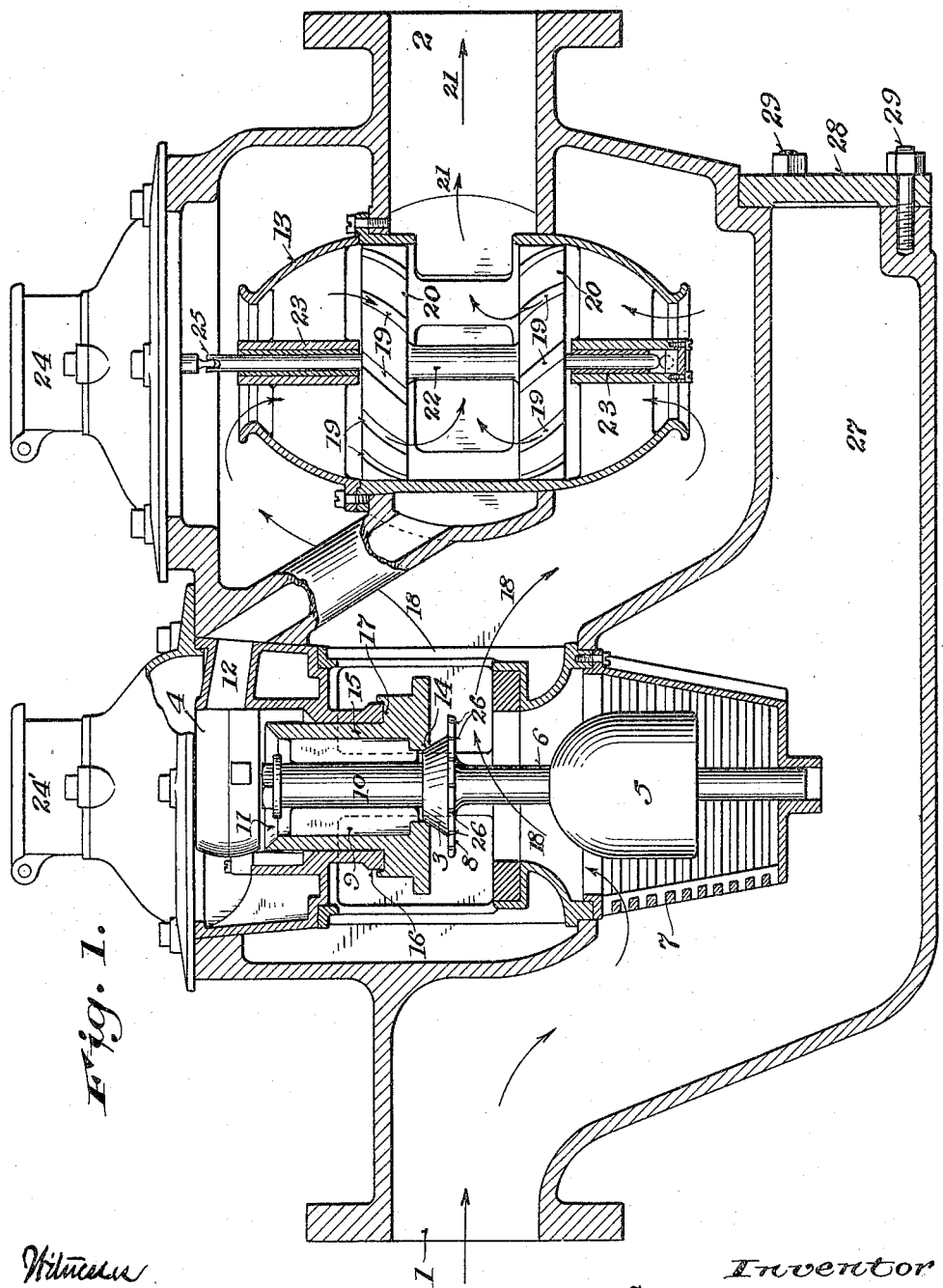

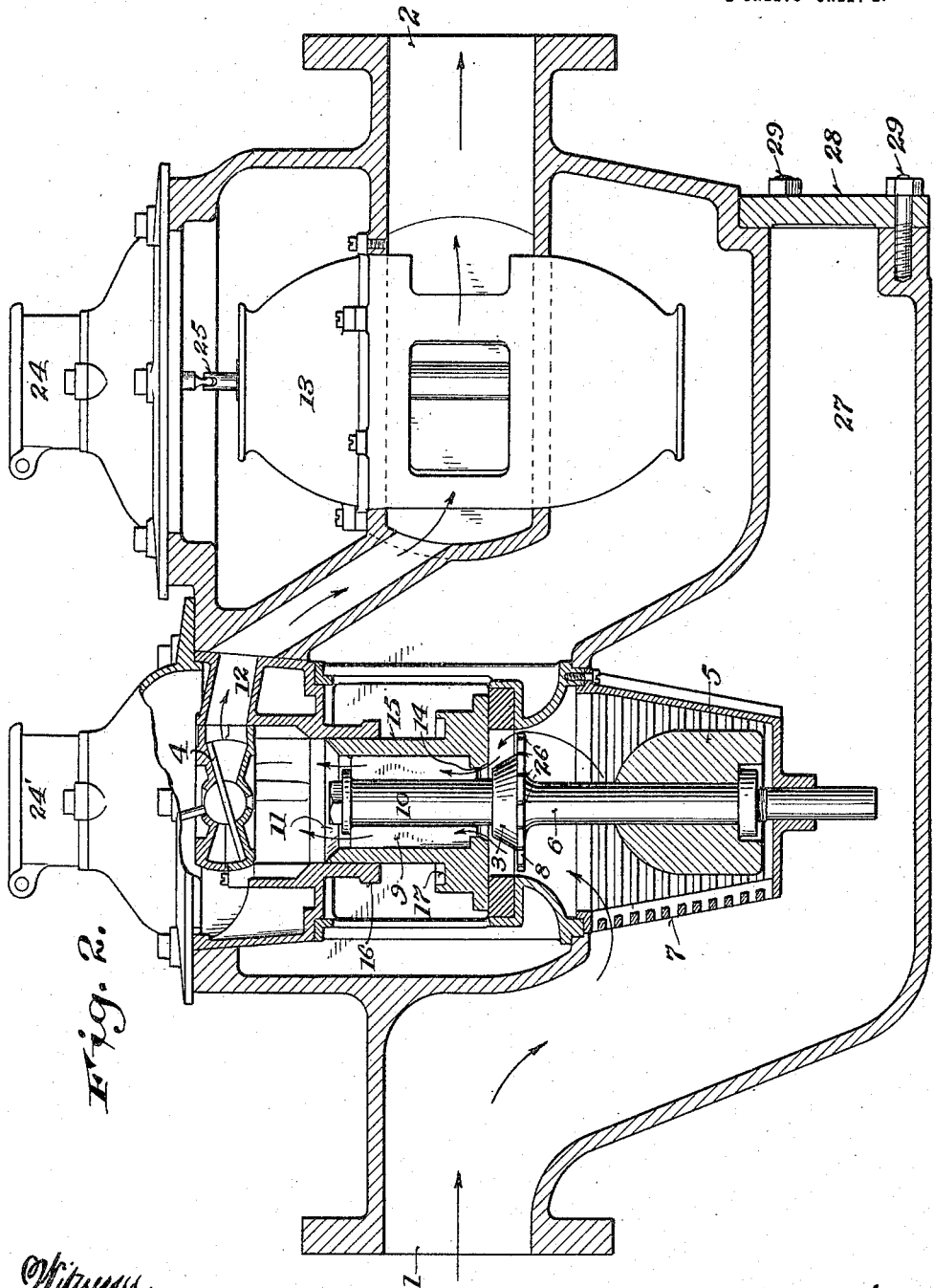

EMIL M. KRUEGER, OF MILWAUKEE, WISCONSIN, ASSIGNOR TO BADGER METER MANUFACTURING CO., OF MILWAUKEE, WISCONSIN.

WATER-METER.

1,186,802.  Specification of Letters Patent.  Patented June 13, 1916.

Application filed April 30, 1915. Serial No. 24,851.

*To all whom it may concern:*

Be it known that I, EMIL M. KRUEGER, a citizen of the United States, residing at the city of Milwaukee, county of Milwaukee, and State of Wisconsin, have invented new and useful Improvements in Water-Meters, of which the following is a specification.

My invention relates to improvements in that class of water meters, which comprises so-called high duty and low duty chambers and measuring devices combined, and my invention consists, more especially, in the valve mechanism for controlling the flow of water to the respective chambers as circumstances may require.

It will be understood that when a small quantity of water only is required it will pass through and be measured by the so-called low duty mechanism in the low duty chamber, while the mechanism in the high duty chamber will remain at rest. When, however, a large volume of water is required the valve mechanism leading to the low duty chamber will be automatically closed when the water will be led direct to the high duty chamber.

It will also be understood that said chambers are provided with separate index dials by which the quantity of water passing through each chamber can be readily ascertained while the total quantity of water which passes through both chambers during a given length of time can readily be ascertained by adding the quantities indicated by the respective dials.

My invention is further explained by reference to the accompanying drawings, in which—

Figure 1 represents a side view partly in vertical section of my meter showing the water controlling valve leading to the low duty chamber in its closed position, whereby all the water passing through the meter is led directly to the high duty chamber, and Fig. 2 shows a similar view of my meter in which the water controlling valve leading to the low duty chamber is shown in its open position, whereby the water is measured solely by the low duty measuring mechanism, and passes through and around the high duty chamber without communicating motion to the mechanism therein.

Like parts are identified by the same reference numerals throughout both views.

1 is an inlet duct through which all the water passes to both chambers, and 2 is the outlet duct through which all the water escapes from such chambers. 3 is a valve by which the passage of water to the low duty chamber or measuring device 4 is controlled. 5 is a weight which is rigidly affixed to the valve stem 6.

It will be understood that when a small quantity of water only is required the valve 3 is drawn down into its open position by the weight 5 when the water will pass from the inlet duct 1, as indicated by the arrows, through the screen 7, thence up past the diaphragm 8 and valve 3 into the chamber 9, whence it passes around the stem 10 and out through the port 11 and measuring device 4 to the duct 12, whence it is led around the case 13 to the outlet duct 2, and thence to the place of consumption. When, however, a large volume of water is being consumed the pressure of the same against the lower side of the diaphragm 8 will cause the valve 3 to be closed. When the valve 3 has been brought to its seat 14 the walls 15 of the chamber 9 will be raised until the lower end of the member 16 will be brought into the annular recess 17, whereby the upward movement of the wall 15 will be stopped, and whereby the water will be caused to take the course indicated by the arrows 18, in Fig. 1, when it will pass directly to the upper and lower ends of the chamber 13, and thence through the channels 19 of the revoluble members 20, and thence out through the duct 2, as indicated by the arrows 21. The members 20 are both supported from the central shaft 22 and said shaft 22 is revolubly supported at its respective ends in the journal boxes 23, 23.

It will, of course, be understood that motion is communicated to the revoluble members 20, 20 by the flow of the current through the angular channels 19, and that the number of revolutions performed by the members 20, 20 will be registered in the ordinary way by an index dial located in the chamber 24, motion being communicated from the revoluble shaft 22 to the index dial located in the chamber 24 through the shaft 25, and in substantially like manner motion will be communicated from the measuring device 4, shown in Fig. 2, to the index dial located in said chamber 24'.

The diaphragm 8 is preferably provided with a plurality of radial saw cuts or slots 26 through which water passes to the smaller chamber when the valve 3 is open. 27 is a chamber for refuse material such as may be removed from the incoming water by the screen 7 as such water passes through the meter. 28 is a removable closure member which is held in place by the bolts 29, which may by withdrawing such bolts be removed.

Having thus described my invention what I claim as new and desire to secure by Letters Patent, is:—

1. In a meter of the described class, comprising two chambers, one for high duty and one for low duty measuring mechanism, an inlet and outlet duct common to both of said chambers, two separate water controlling valves connected together, one of said valves being adapted to control the flow of water to said low duty chamber, and the other to control the flow of water to said high duty chamber, a weight connected with the valve stem of the valve leading to said low duty chamber adapted to open communication with said last named chamber and to cause the water controlling valve to said high duty chamber to close, a diaphragm connected with said valve stem, said diaphragm being adapted to be moved by the excess of pressure of water when a large quantity is supplied, whereby the valve leading to said low duty chamber is first closed when by the further movement of said diaphragm and valve the larger valve leading to said high duty chamber is opened, whereby both small and large quantities of water may be accurately measured.

2. In a meter of the described class comprising two chambers, a high duty and low duty chamber, an inlet and outlet duct common to both of said chambers, two separate water controlling valves connected together, one of said valves being adapted to control the flow of water to said low duty chamber, and the other to control a flow of water to said high duty chamber, a slidable chamber formed integrally with the seat of said first named valve, a weight connected with the valve stem of the valve leading to said low duty chamber, adapted to open communication with said last named chamber and to cause the water controlling valve to said high duty chamber to close, a diaphragm connected with said valve stem, said diaphragm being adapted to be moved by the excess of pressure of water when a large quantity is supplied, whereby the valve leading to said low duty chamber is first closed when by further movement of said diaphragm and valve the larger valve leading to said high duty chamber is opened, whereby both small and large quantities of water may be accurately measured.

3. In a meter of the described class comprising a high duty and low duty chamber, an inlet and outlet duct common to both of said chambers, two separate water controlling valves connected together, one of said valves being adapted to control the flow of water to said low duty chamber, and the other to control a flow of water to said high duty chamber, a slidable chamber formed integrally with the seat of said first named valve, a weight connected with the valve stem of the valve leading to said low duty chamber, adapted to open communication with said last named chamber and to cause the water controlling valve to said high duty chamber to close, a diaphragm connected with said valve stem, said diaphragm being adapted to be moved by the excess of pressure of water when a large quantity is supplied, whereby the valve leading to said low duty chamber is first closed when by the further movement of said diaphragm and valve the larger valve leading to said high duty chamber is opened, and means connected with the supporting stems of the measuring mechanism for registering the total quantity of water passing through said chambers.

In testimony whereof I affix my signature in the presence of two witnesses.

EMIL M. KRUEGER.

Witnesses:
JAS. B. ENVIN,
ALICE J. McKERIHAN.